US012747383B2

(12) United States Patent
Viganò et al.

(10) Patent No.: US 12,747,383 B2

(45) Date of Patent: Sep. 29, 2026

(54) SHALE HYDRATION INHIBITORS AND SUBTERRANEAN TREATMENT FLUIDS CONTAINING THEM

(71) Applicant: LAMBERTI SPA, Albizzate (IT)

(72) Inventors: Laura Viganò, Parabiago (IT); Lorenzo Giardini, Genoa (IT); Letizia Privitera, Sumirago (IT); Luigi Merli, Saronno (IT); Daniele Crosta, Gavirate (IT); Pierangelo Pirovano, Comerio (IT); Alessandro D'Aloia, Novi Ligure (IT); Cristina Picco, Oleggio (IT)

(73) Assignee: LAMBERTI SPA, Albizzate (IT)

( * ) Notice: Subject to any disclaimer, the term of this patent is extended or adjusted under 35 U.S.C. 154(b) by 625 days.

(21) Appl. No.: 18/262,028

(22) PCT Filed: Feb. 1, 2022

(86) PCT No.: PCT/EP2022/052343
§ 371 (c)(1),
(2) Date: Jul. 19, 2023

(87) PCT Pub. No.: WO2022/167415
PCT Pub. Date: Aug. 11, 2022

(65) Prior Publication Data

US 2024/0101886 A1 Mar. 28, 2024

(30) Foreign Application Priority Data

Feb. 4, 2021 (IT) ........................ 102021000002456

(51) Int. Cl.
*C09K 8/12* (2006.01)

(52) U.S. Cl.
CPC ............ *C09K 8/12* (2013.01); *C09K 2208/12* (2013.01)

(58) Field of Classification Search
CPC ... C09K 8/12; C09K 8/68; C09K 8/52; C09K 8/035; C09K 2208/12
See application file for complete search history.

(56) References Cited

U.S. PATENT DOCUMENTS

| | | | | |
|---|---|---|---|---|
| 6,247,543 | B1 | 6/2001 | Patel et al. | |
| 6,484,821 | B1 | 11/2002 | Patel et al. | |
| 6,609,578 | B2 | 8/2003 | Patel et al. | |
| 9,637,681 | B2 | 5/2017 | Badel et al. | |
| 2002/0155956 | A1 | 10/2002 | Chamberlain et al. | |
| 2003/0106718 | A1 | 6/2003 | Patel et al. | |
| 2009/0239771 | A1 * | 9/2009 | Federici .................. | C09K 8/12 507/131 |
| 2012/0114523 | A1 | 5/2012 | Hellberg et al. | |
| 2019/0136146 | A1 | 5/2019 | Chang et al. | |

FOREIGN PATENT DOCUMENTS

| | | | |
|---|---|---|---|
| CN | 104937068 | B | 3/2018 |
| EP | 2061856 | B1 | 1/2011 |
| WO | 2022/167415 | A1 | 11/2022 |

OTHER PUBLICATIONS

ISR—WO dated Apr. 21, 2022 for parent application PCT/EP2022/052343.

* cited by examiner

*Primary Examiner* — Aiqun Li

(74) *Attorney, Agent, or Firm* — Vorys, Sater, Seymour and Pease LLP

(57) ABSTRACT

Method for inhibiting the swelling and/or the dispersion of shales during the treatment of subterranean shale formations comprising the steps of: a) providing a subterranean treatment fluid comprising from 0.001 to 10% by weight of a polyester obtained by reacting a dicarboxylic acid having from 2 to 8 carbon atoms with a specific alkoxylated diamine; b) introducing said treatment fluid into a wellbore at a pressure sufficient to treat the subterranean shale formations.

20 Claims, No Drawings

SHALE HYDRATION INHIBITORS AND SUBTERRANEAN TREATMENT FLUIDS CONTAINING THEM

TECHNICAL FIELD

The present invention relates to a method for inhibiting the swelling and/or the dispersion of shales in the treatment of subterranean shale formations, i.e. in subterranean formations comprising or releasing shales, wherein said method comprises the use of a polyester obtained by reacting an alkoxylated diamine and a dicarboxylic acid.

A further object of the present invention is a subterranean treatment fluid comprising said polyester.

BACKGROUND OF THE ART

Water-based subterranean treatment fluids contain solid particles suspended in water or brine. Various other components may be added, deliberately or otherwise, to said water-based subterranean treatment fluids: a) organic or inorganic colloids, such as clays, used to impart viscosity and filtration properties; b) soluble salts or insoluble inorganic minerals used to increase the fluid density; c) other optional components that may be added to impart desirable properties, such as dispersants, lubricants, corrosion inhibitors, defoamers or surfactants; d) formation solids which may disperse into the fluid during the subterranean operations. For example, formation solids that become dispersed in a drilling fluid include cuttings from drilling and soil and/or solids from the surrounding unstable formation. When the formation yields solids that can swell in water, such as shales, they can potentially compromise drilling time and increase costs. Shales are mainly layered aluminum silicates, in which the dominant structure consists of layers formed by sheets of silica and alumina that can have exposed oxygen atoms and hydroxyls. When atoms having different valences are positioned within the layers of the structure, they create a negative potential at the layer surface, which causes cations to be adsorbed thereto. These adsorbed cations are called exchangeable cations because they may chemically exchange places with other cations when the shale crystal is suspended in water. The type of substitutions occurring within the layers of the shale and the exchangeable cations adsorbed on the surface affect shale swelling.

There are different types of water swelling. For example, surface hydration gives swelling with a large number of water molecules adsorbed by hydrogen interaction on the oxygen atoms exposed on the layer surfaces. All types of shale can swell in this manner.

Another type of swelling is called osmotic swelling. Where the concentration of cations between layers in a shale mineral is higher than the cation concentration in the surrounding water, water is osmotically drawn between the unit layers. Osmotic swelling results in larger overall volume increase than surface hydration. The shales that do not give this inter-layers swelling tend to disperse in water.

All types of shale swelling can cause a series of problems, for example sticking of the shales onto the drill string and bit, increasing torque and drag between the drill string and the sides of the borehole, caving or sloughing of the borehole walls and inducing an uncontrollable increase of the viscosity of the treatment fluid.

This is why the development of effective substances, which reduce or block the swelling and/or the dispersion of shales, namely of shale inhibitors, is important to the oil and gas industry. The present invention works towards a solution of these difficulties.

Several patents describe techniques or compounds which can be used to inhibit shales, including inorganic salts such as potassium chloride, polyalkoxy diamines and their salts, described in U.S. Pat. Nos. 6,484,821, 6,609,578, 6,247,543 and US 2003/0106718, oligomethylene diamines and their salts, described in U.S. Pat. No. 5,771,971 and US 2002/0155956. However, salts flocculate the clays, which causes both high fluid losses and an almost complete loss of thixotropy. Further, increasing salinity often decreases the functional characteristics of the subterranean treatment fluid.

EP 2 061 856 B1 describes a method for inhibiting the hydration of clays and shales during drilling operations comprising the use of a water base drilling fluid, which contains from 0.2 to 5% by weight of the condensation product of a dicarboxylic acid having 4 to 10 carbon atoms with alkanolamines, diamines or polyalkyleneamines of formula R'''R''N—R'—XH, where X is O or NR°; R° is hydrogen or a linear or branched alkyl group having from 1 to 6 carbon atoms, R' is a linear or branched, aliphatic or cycloaliphatic alkylene group having from 2 to 10 carbon atoms or R' is R''''(NH—R'''')n where R'''' is ethylene or $CH(CH_3)CH_2$, n is a number from 1 to 6 and X is NR°; R'' and R''' can be equal or different from one another and are hydrogen or a linear or branched alkyl group having from 1 to 6 carbon atoms, optionally substituted with a hydroxyl group, the condensation product being in neutral form or in the form of salt.

Despite various shale inhibitors have been developed, a need still exists in the art for compounds which can effectively act as shale inhibitors when used in subterranean treatment fluids.

SUMMARY OF THE INVENTION

It is therefore an object of the present invention a method for inhibiting the swelling and/or the dispersion of shales during the treatment of subterranean shale formations comprising the steps of:

a) providing a subterranean treatment fluid comprising from 0.001 to 10% by weight (wt %) of a polyester obtained by reacting a dicarboxylic acid having from 2 to 8 carbon atoms with an alkoxylated diamine of Formula (I)

(I)

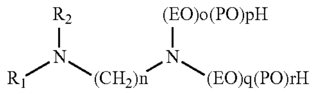

wherein:

$R_1$ and $R_2$ are equal or different and are saturated or unsaturated aliphatic $C_1$-$C_4$ alkyl chains;

n is an integer number comprised between 1 and 5;

EO is $CH_2CH_2O$;

PO is $CH_2CH(CH_3)O$;

o, p, q and r are integer numbers comprised between 0 and 10, with the proviso that:

i) the sum of o, p, q and r is at least 2 ii) o and p cannot be both equal to 0 iii) q and r cannot be both equal to 0;

b) introducing said treatment fluid into a wellbore at a pressure sufficient to treat the subterranean shale formations.

In another aspect, the invention relates to a subterranean treatment fluid comprising an aqueous continuous phase and from 0.001 to 10% by weight (wt %) of a polyester obtained by reacting a dicarboxylic acid having from 2 to 8 carbon atoms with an alkoxylated diamine of Formula (I)

(I)

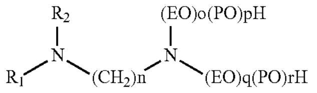

wherein:

$R_1$ and $R_2$ are equal or different and are saturated or unsaturated aliphatic $C_1$-$C_4$ alkyl chains; n is an integer number comprised between 1 and 5;

EO is $CH_2CH_2O$;

PO is $CH_2CH(CH_3)O$;

o, p, q and r are integer numbers comprised between 0 and 10, with the proviso that:

i) the sum of o, p, q and r is at least 2 ii) o and p cannot be both equal to 0 iii) q and r cannot be both equal to 0.

As used herein, the term “shale” refers to a common sedimentary rock with porosity but little matrix permeability. In particular, shales usually consist of particles of sedimentary rock finer than sand grade (diameter<0.0625 mm) and include both clay and silt grade material.

As used herein, the term “clay” refers to a fine-grade sedimentary rock (diameter<0.004 mm). Most common clays include smectite (montmorillinite), illite, kaolinite and chlorite.

As used herein, the term “silt” refers to a sedimentary rock whose particles are between clay and sand in size (about 0.002 mm<diameter<0.074 mm).

As used herein, the expression “subterranean treatment,” refers to any subterranean operation that uses a specific fluid in conjunction with a desired function and/or for a desired purpose.

DETAILED DESCRIPTION OF THE INVENTION

Preferably, the method for inhibiting the swelling and/or the dispersion of shales during the treatment of subterranean shale formations comprises the steps of:

a) providing a subterranean treatment fluid comprising from 0.01 to 3% by weight (wt %) of a polyester obtained by reacting a dicarboxylic acid having 6 carbon atoms with an alkoxylated diamine of Formula (I)

(I)

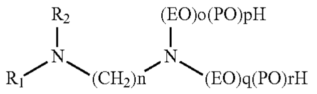

wherein:

$R_1$ and $R_2$ are equal or different and are or unsaturated aliphatic $C_1$-$C_4$ alkyl chains;

n is 3;

EO is $CH_2CH_2O$;

PO is $CH_2CH(CH_3)O$;

o, p, q and r are integer numbers comprised between 0 and 5, with the proviso that:

i) the sum of o, p, q and r is at least 2 ii) o and p cannot be both equal to 0 iii) q and r cannot be both equal to 0;

b) introducing said treatment fluid into a wellbore at a pressure sufficient to treat the subterranean shale formations.

Preferably, the subterranean treatment fluid comprises an aqueous continuous phase and from 0.01 to 3% by weight (wt %) of a polyester obtained by reacting a dicarboxylic acid having 6 carbon atoms with an alkoxylated diamine of Formula (I)

(I)

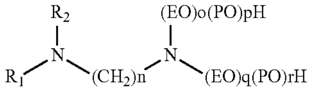

wherein:

$R_1$ and $R_2$ are equal or different and are saturated or unsaturated aliphatic $C_1$-$C_4$ alkyl chains;

n is 3;

EO is $CH_2CH_2O$;

PO is $CH_2CH(CH_3)O$;

o, p, q and r are integer numbers comprised between 0 and 5, with the proviso that:

i) the sum of o, p, q and r is at least 2 ii) o and p cannot be both equal to 0 iii) q and r cannot be both equal to 0.

The polyester of the present invention may be prepared by a two-step synthesis. In the first step a N,N-dialkyl alkylene diamine is reacted, under nitrogen atmosphere and at a temperature comprised between 110 and 140° C. with 2 to 20, preferably 2 to 10 moles of at least one alkylene oxide to obtain an alkoxylated diamine of Formula (I). The at least one alkylene oxide can be added in a single stage or with different subsequent additions. In the second step said alkoxylated diamine of Formula (I) is reacted with a dicarboxylic acid, in the presence of a suitable catalyst, under stirring without any solvent, at a temperature ranging from 100 to 180° C. and removing by distillation the water that is formed during the reaction. The dicarboxylic acid and the alkoxylated diamine of Formula (I) are preferably reacted in a molar ratio ranging from 0.8:1 to 1:0.8. More preferably, they are reacted in a molar ratio of 1:1.

Typically, the polyester of the invention has an acid number ranging from into 150 mg OH/g. The N,N-dialkyl alkylene diamines suitable for preparing the alkoxylated diamine of Formula (I) preferably are N,N-dialkyl propylene diamines of formula $R_1R_2N—CH_2CH_2CH_2—NH_2$, wherein $R_1$ and $R_2$ are, independently of each other, saturated or unsaturated aliphatic $C_1$-$C_4$ alkyl chains. According to the present invention, the most preferred N,N-dialkyl alkylene diamines are N,N-dimethylpropane-1,3-diamine, also known as dimethylaminopropylamine (DMAPA), or N,N-dibutylpropane-1,3-diamine, also known as dibutylaminopropylamine (DBAPA).

According to the invention, the at least one alkylene oxide suitable for preparing the alkoxylated diamine of Formula (I) preferably is ethylene oxide and/or propylene oxide.

According to the invention, the dicarboxylic acid is an aliphatic or cycloaliphatic dicarboxylic acid. Preferably, said dicarboxylic acid is a saturated or unsaturated aliphatic dicarboxylic acid having from 2 to 8 carbon atoms. Suitable dicarboxylic acids include oxalic acid, succinic acid, adipic acid, sebacic acid, fumaric acid and maleic acid. The corresponding anhydrides are also suitable. According to a preferred embodiment, the dicarboxylic acid is adipic acid. The subterranean treatment fluid of the present invention is suitable for use in any treatment of subterranean formations wherein shale inhibitors can be necessary.

The fluid disclosed herein is useful in the drilling, completion and working-over of subterranean oil and gas wells and also in stimulation operations (such as fracturing), gravel packing, cementing, maintenance, reactivation, cuttings reinjection, etc.

Preferably, the subterranean treatment fluid is a drilling fluid or an aqueous hydraulic fracturing fluid.

When the subterranean treatment fluid of the invention is a drilling fluid, the subterranean treatment fluid comprises customary additives, well known by those skilled in the art, such as viscosifying agents, dispersing agents, lubricants, fluid loss control agents, corrosion inhibitors, defoaming agents and surfactants.

The drilling fluid can further comprise an aqueous continuous phase and a weighting material, which can be selected from: barite, hematite, ilmenite, iron oxide, calcium carbonate, magnesium carbonate, magnesium organic and inorganic salts, calcium chloride, calcium bromide, magnesium chloride, zinc halides, alkali metal halides, alkali metal formates, alkali metal nitrates, and combinations thereof. Usually, the subterranean treatment fluid can contain between 1 and 70% wt of weighting material, depending on the desired density. The aqueous continuous phase may be selected from: fresh water, sea water, brine, mixtures of water and water-soluble organic compounds, and mixtures thereof.

When the subterranean treatment fluid of the invention is an aqueous hydraulic fracturing fluid, the fluid can be, for example, a gelled fluid, including linear or crosslinked gels, or a foamed gel, wherein foam bubbles help to transport and to place proppants into fractures. The aqueous hydraulic fracturing fluid can comprise an aqueous component which may be selected from fresh water, salt water, seawater, natural or synthetic brine, mixtures of water and water soluble organic compounds, any other aqueous liquid that does not interact with the other components of the aqueous hydraulic fracturing fluid to adversely affect its performance, and mixtures thereof.

The aqueous fracturing fluid normally contains a viscosifying agent, a crosslinker system and additives that are well known by those skilled in the art, such as proppants, gel stabilizers, gel breakers, surfactants, alcohols, scale inhibitors, corrosion inhibitors, fluid-loss additives, buffers, bactericides, and the like.

Useful proppants include, but are not limited to, gravel, sand, resin coated sand, ceramic beads, bauxite, glass, glass beads and mixtures thereof.

Gel stabilizers are oxidation inhibitors or free radical scavengers, which remove dissolved oxygen from water. Dissolved oxygen is the major cause of oxidative free radical polymer breakdown of the water soluble natural polymers or their derivatives which are used as viscosifying agents. Examples of suitable gel stabilizers are sodium thiosulfate, substituted benzofuranones, hydroxylamine in the form of its salts and alkyl derivatives, trivalent phosphorus compounds, hydroquinone and hydroquinone formulated with amines, natural antioxidants such as ascorbic acid and vitamin C, and methylethyl ketoxime. Useful gel breakers include, but are not limited to, ammonium persulfate, sodium persulfate, sodium bromate and sodium chlorite, enzymes.

The invention is further illustrated by the following examples.

EXAMPLES

Example 1(Comparative)

Preparation of an amino-ester from adipic acid and triethanolamine (as described in prior art patent EP 2 061 856 B1)

In a 1 liter reaction vessel equipped with stirrer, thermometer and distillation head 204.8 g (1.37 moles) of triethanolamine are charged, heat is applied to reach 120° C. and 95.6 g (0.65 moles) of adipic acid are added. Vacuum is applied to the reaction vessel to reach a residual pressure of about 20 mm Hg. Heating is applied to reach 175° C. in about one hour. After 3 hours 23 g of water have distilled and the acid number is 3.5 mg KOH/g.

Example 2 (Comparative)

Preparation of a Polyester from Oxalic Acid and Methyl Diethanolamine

In a reaction vessel equipped with heating, stirrer, thermometer, a system of introduction of the reagents, such reaction vessel connected to a cooler provided of collector of water, methyl diethanolamine (152.7 g), oxalic acid (105 g) and zirconium acetylacetonate (0.13 g) are added. The reaction mixture is slowly heated to 155° C. under stirring and nitrogen flow. The reaction mixture is maintained at 155-165° C. until the acid number reaches a value of approximately 13 mg KOH/g.

Example 3 i) Preparation of Ethoxylated (2 mol) Dimethylaminopropylamine

In a stirred stainless steel reactor equipped for temperature measurement and control, pressure measurement, vacuum and inert gas purging, sampling and for introduction of ethylene oxide as a liquid, dimethylaminopropylamine (1945 g) is added. The reactor is pressurized then vented three times to remove atmospheric oxygen. The reactor is pressurized with nitrogen to 110-140 kPa and heated to 120° C. Ethylene oxide (1555 g) is then added while the temperature is maintained at 120-130° C. After being maintained at reaction temperature for 30 minutes, the reaction mixture is cooled to 60° C.

ii) Preparation of a Polyester from Adipic Acid and Ethoxylated (2 mol) Dimethylaminopropylamine In a reaction vessel equipped with heating, stirrer, thermometer, a system of introduction of the reagents, such reaction vessel connected to a cooler provided of collector of water, ethoxylated (2 mol) dimethylaminopropylamine (364.37 g), adipic acid (236.01 g) and zirconium acetylacetonate (0.30 g) are added. The reaction mixture is slowly heated to 165° C. under stirring and nitrogen flow. The reaction mixture is maintained at 165-175° C. until the acid number reaches a value of approximately 47 mg KOH/g.

Example 4 i) Preparation of Ethoxylated (5 mol) Dimethylaminopropylamine

In a stirred stainless steel reactor equipped for temperature measurement and control, pressure measurement, vacuum and inert gas purging, sampling and for introduction of ethylene oxide as a liquid, dimethylaminopropylamine (1320 g) is added. The reactor is pressurized then vented three times to remove atmospheric oxygen. The reactor is pressurized with nitrogen to 110-140 kPa and heated to 120° C. Ethylene oxide (first addition, 1112 g) is then added while the temperature is maintained at 120-130° C. After being maintained at reaction temperature for 30 minutes, the reaction mixture is cooled to 80° C. and a sodium methoxide solution, 30% in methanol (10 g) is added. The reactor is pressurized then vented three times to remove atmospheric oxygen. The reactor is maintained under vacuum and nitrogen flow for 15 minutes to remove methanol. The reactor is pressurized with nitrogen to 110-140 kPa and heated to 120° C. Ethylene oxide (second addition, 1560 g) is then added while the temperature is maintained at 120-130° C. After being maintained at reaction temperature for 30 minutes, the reaction mixture is cooled to 80° C. and an 80% acetic acid aqueous solution (5.0 g) is added.

ii) Preparation of a Polyester from Adipic Acid and Ethoxylated (5 mol) Dimethylaminopropylamine In a reaction vessel equipped with heating, stirrer, thermometer, a system of introduction of the reagents, such reaction vessel connected to a cooler provided of collector of water, ethoxylated (5 mol) dimethylaminopropylamine (172 g), adipic acid (78 g) and zirconium acetylacetonate (0.125 g) are added. The reaction mixture is slowly heated to 155° C. under stirring and nitrogen flow. The reaction mixture is maintained at 155-165° C. until the acid number reaches a value of approximately 66 mg KOH/g.

Example 5 i) Preparation of Propoxylated (2 mol) Dimethylaminopropylamine

In a stirred stainless steel reactor equipped for temperature measurement and control, pressure measurement, vacuum and inert gas purging, sampling and for introduction of propylene oxide as a liquid, dimethylaminopropylamine (2060.6 g) is added. The reactor is pressurized then vented three times to remove atmospheric oxygen. The reactor is pressurized with nitrogen to 110-140 kPa and heated to 120° C. Propylene oxide (2343.1 g) is then added while the temperature is maintained at 120-130° C. After being maintained at reaction temperature for 120 minutes, the reaction mixture is cooled to 60° C.

ii) Preparation of a Polyester from Adipic Acid and Propoxylated (2 mol) Dimethylaminopropylamine In a reaction vessel equipped with heating, stirrer, thermometer, a system of introduction of the reagents, such reaction vessel connected to a cooler provided of collector of water, propoxylated (2 mol) dimethylaminopropylamine (172.82 g), adipic acid (77.17 g) and zirconium acetylacetonate (0.125 g) are added. The reaction mixture is slowly heated to 165° C. under stirring and nitrogen flow. The reaction mixture is maintained at 165-175° C. until the acid number reaches a value of approximately 42 mg KOH/g.

Example 6 i) Preparation of Propoxylated (5 mol) Dimethylaminopropylamine

In a stirred stainless steel reactor equipped for temperature measurement and control, pressure measurement, vacuum and inert gas purging, sampling and for introduction of propylene oxide as a liquid, propoxylated (2 mol) dimethylaminopropylamine (1400.7 g) and sodium methoxide solution, 30% in methanol (6.26 g) are added. The reactor is heated to 85° C., pressurized then vented three times to remove atmospheric oxygen. The reactor is maintained under vacuum and nitrogen flow for 15 minutes to remove methanol. The reactor is pressurized with nitrogen to 110-140 kPa and heated to 120° C. Propylene oxide (1118.1 g) is then added while the temperature is maintained at 120-130° C. After being maintained at reaction temperature for 30 minutes, the reaction mixture is cooled to 60° C. and an 80% acetic acid aqueous solution (3.0 g) is added.

ii) Preparation of a Polyester from Adipic Acid and Propoxylated (5 mol) Dimethylaminopropylamine In a reaction vessel equipped with heating, stirrer, thermometer, a system of introduction of the reagents, such reaction vessel connected to a cooler provided of collector of water, propoxylated (5 mol) dimethylaminopropylamine (218.58 g), adipic acid (81.42 g) and zirconium acetylacetonate (0.15 g) are added. The reaction mixture is slowly heated to 165° C. under stirring and nitrogen flow. The reaction mixture is maintained at 165-175° C. until the acid number reaches a value of approximately 105 mg KOH/g.

Example 7 i) Preparation of Ethoxylated (2 mol) Dibutylaminopropylamine

In a stirred stainless steel reactor equipped for temperature measurement and control, pressure measurement, vacuum and inert gas purging, sampling and for introduction of ethylene oxide as a liquid, N,N-dibutylaminopropylamine (1557.2 g) is added. The reactor is pressurized then vented three times to remove atmospheric oxygen. The reactor is pressurized with nitrogen to 110-140 kPa and heated to 130° C.

Ethylene oxide (755.0 g) is then added while the temperature is maintained at 130-140° C. After being maintained at reaction temperature for 60 minutes, the reaction mixture is cooled to 60° C.

ii) Preparation of a Polyester from Adipic Acid and Ethoxylated (2 mol) Dibutylaminopropylamine In a reaction vessel equipped with heating, stirrer, thermometer, a system of introduction of the reagents, such reaction vessel connected to a cooler provided of collector of water, ethoxylated (2 mol) dibutylaminopropylamine (1023.0 g), adipic acid (545.0 g) and zirconium acetylacetonate (0.8 g) are added. The reaction mixture is slowly heated to 190° C. under stirring and nitrogen flow. The reaction mixture is maintained at 190-195° C. until the acid number reaches a value of approximately 45 mg KOH/g.

Performance Evaluation

The shale inhibition performances were evaluated by using the "Shale Particle Disintegration Test".

Before performing the test, the shales were dried at 70° C. for 3 hours. Then the dried shales were then ground and sieved through both a 5 mesh (4 mm) sieve and a 10 mesh (2 mm sieve).

The shale particles with a size below 4 mm but larger than 2 mm were used in this test.

The shale particles used in the test has the following composition: 72% of illite/smectite, 19% of illite, 8% kaolinite, 2% of chlorite. The relative percentage refers to the amount of mineral present in the fraction having particle size less than 2 μm.

Shale Particle Disintegration Test

The test was performed following the procedure described in the standard method ISO 10416, section 22, with some modifications.

5 g of a 40% water solution of shale inhibitor were added to 350 ml of synthetic sea water and, then, the fluid was mixed with an Hamilton Beach shaker for 15 minutes. All samples were adjusted to at pH of 9.

100 g of sized shale sample were added to the fluid in a stainless steel ageing cell which was subsequently closed and vigorously shacked to disperse the shale particles. The cell was placed in a pre-heated oven and hot rolled at 70° C. for 16 hours. When the 16 hours hot roll was complete, the sample was cooled to room temperature.

The contents of the sample cells were then poured onto two sieves: 10 mesh (2 mm) and 35 mesh (0.5 mm).

The residual shales in the cells were recovered by washing with a KCl solution (42.75 g/l).

The sieves were transferred in a bath containing tap water and quickly but gently submerged in order to rinse both the sieve and the shales.

The recovered shales were then placed in a pre-weighed dish and dried in oven at 105° C. to constant weight.

After drying, the shales were cooled in a desiccator and weighed. The % recovery of the shales for each mud was calculated with following formula:

$$\% \text{ recovery} = (\text{weight in grams of shale recovered})/(100 - w_h) \times 100$$

where $w_h$ is the initial moisture content in % by weight of the sized shale. The initial moisture content of the shale was determined by weight loss at 105° C.

The results (% recovery) are reported in Table 1.

The higher the % recovery, the higher the performance of the shale inhibitors.

The results reported in Tables i show that the polyester of the invention show improved shale inhibition properties, when compared with shale inhibitors of the prior art (Example 1).

In addition, the polyester of the invention show much better shale inhibition properties than common shale inhibitors such as potassium chloride (KCl).

TABLE 1

| | % Recovery (10 mesh) | % Recovery (35 mesh) | % Total Recovery |
|---|---|---|---|
| KCl* | 3.0 | 5.0 | 8.0 |
| Example 1* | 6.2 | 12.1 | 18.4 |
| Example 2* | 3.3 | 7.5 | 10.8 |
| Example 3 | 4.1 | 25.9 | 30.0 |
| Example 4 | 6.4 | 15.7 | 22.1 |
| Example 5 | 9.8 | 16.2 | 26.0 |
| Example 6 | 8.6 | 14.0 | 22.6 |
| Example 7 | 8.6 | 11.6 | 20.2 |

*Comparative

The invention claimed is:

1. A method for inhibiting the swelling and/or the dispersion of shales during the treatment of subterranean shale formations comprising the steps of:

a) providing a subterranean treatment fluid comprising from 0.001 to 10% by weight (wt %) of a polyester obtained by reacting a dicarboxylic acid having from 2 to 8 carbon atoms with an alkoxylated diamine of Formula (I)

(I)

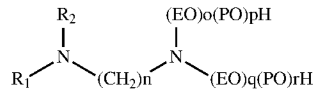

wherein:

$R_1$ and $R_2$ are equal or different and are saturated or unsaturated aliphatic $C_1$-$C_4$ alkyl chains;

n is an integer number comprised between 1 and 5;

EO is $CH_2CH_2O$;

PO is $CH_2CH(CH_3)O$;

o, p, q and r are integer numbers comprised between 0 and 10, with the proviso that:

i) the sum of o, p, q and r is at least 2 ii) o and p cannot be both equal to 0 iii) q and r cannot be both equal to 0;

b) introducing said treatment fluid into a wellbore at a pressure sufficient to treat the subterranean shale formations.

2. The method according to claim 1, wherein in Formula (I) n is 3.

3. The method according to claim 2, wherein in Formula (I) o, p, q and r are integer numbers comprised between 0 and 5.

4. The method according to claim 3, wherein in Formula (I) $R_1$ and $R_2$ are both methyl or both butyl.

5. The method according to claim 4, wherein in Formula (I) $R_1$ and $R_2$ are both methyl.

6. The method according to claim 4, wherein the dicarboxylic acid is adipic acid.

7. The method according to claim 1, wherein the polyester is obtained by reacting the dicarboxylic acid and the alkoxylated diamine of Formula (I) in a molar ratio ranging from 0.8:1 to 1:0.8.

8. The method according to claim 1, wherein the polyester has an acid number ranging from 10 to 150 mg OH/g.

9. The method according to claim 1, wherein the dicarboxylic acid is adipic acid.

10. The method according to claim 1, wherein the subterranean treatment fluid comprises from 0.01 to 3% by weight (wt %) of the polyester.

11. A subterranean treatment fluid comprising an aqueous continuous phase and from 0.001 to 10% by weight (wt %) of a polyester obtained by reacting a dicarboxylic acid having from 2 to 8 carbon atoms with an alkoxylated diamine of Formula (I)

(I)

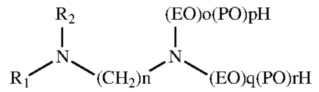

wherein:

$R_1$ and $R_2$ are equal or different and are saturated or unsaturated aliphatic $C_1$-$C_4$ alkyl chains;

n is an integer number comprised between 1 and 5;

EO is $CH_2CH_2O$;

PO is $CH_2CH(CH_3)O$;

o, p, q and r are integer numbers comprised between 0 and 10, with the proviso that:

i) the sum of o, p, q and r is at least 2 ii) o and p cannot be both equal to 0 iii) q and r cannot be both equal to 0.

12. The subterranean treatment fluid according to claim 11, wherein in Formula (I) n is 3.

13. The subterranean treatment fluid according to claim 12, wherein in Formula (I) o, p, q and r are integer numbers comprised between 0 and 5.

14. The subterranean treatment fluid according to claim 13, wherein in Formula (I) $R_1$ and $R_2$ are both methyl or both butyl.

15. The subterranean treatment fluid according to claim 14, wherein in Formula (I) $R_1$ and $R_2$ are both methyl.

16. The subterranean treatment fluid according to claim 14, wherein the dicarboxylic acid is adipic acid.

17. The subterranean treatment fluid according to claim 11 wherein the polyester is obtained by reacting the dicarboxylic acid and the alkoxylated diamine of Formula (I) in a molar ratio ranging from 0.8:1 to 1:0.8.

18. The subterranean treatment fluid according to claim 11, wherein the polyester has an acid number ranging from 10 to 150 mg OH/g.

19. The subterranean treatment fluid according to claim 11, wherein the dicarboxylic acid is adipic acid.

20. The subterranean treatment fluid according to claim 11, wherein the subterranean treatment fluid comprises from 0.01 to 3% by weight (wt %) of the polyester.

* * * * *